(12) United States Patent
Winter

(10) Patent No.: US 8,130,761 B2
(45) Date of Patent: Mar. 6, 2012

(54) METHOD AND SYSTEM FOR PROVIDING CONFIRMED DELIVERY OF ETHERNET PACKETS

(75) Inventor: Robert L. Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 1080 days.

(21) Appl. No.: 12/009,668

(22) Filed: Jan. 22, 2008

(65) Prior Publication Data
US 2009/0185551 A1 Jul. 23, 2009

(51) Int. Cl.
*H04L 12/56* (2006.01)
(52) U.S. Cl. ...................................... 370/394
(58) Field of Classification Search .................. None
See application file for complete search history.

(56) References Cited

U.S. PATENT DOCUMENTS

| | | | |
|---|---|---|---|
| 5,127,041 A * | 6/1992 | O'Sullivan | 455/557 |
| 5,587,997 A | 12/1996 | Jacobson | 370/253 |
| 6,215,797 B1 | 4/2001 | Fellman | 370/503 |
| 6,909,717 B1 | 6/2005 | Higgins | 370/394 |
| 2005/0265316 A1 * | 12/2005 | Liu et al. | 370/352 |
| 2006/0069793 A1 * | 3/2006 | Li et al. | 709/231 |
| 2006/0129650 A1 | 6/2006 | Ho et al. | 709/207 |
| 2007/0263631 A1 * | 11/2007 | Mallory | 370/394 |
| 2009/0010160 A1 * | 1/2009 | Tzeng et al. | 370/231 |

OTHER PUBLICATIONS

Ethertypes, "*Ethernet Types*," Apr. 1998.
IEEE Standards Association, "*Ether Type Field Listing*" Jan. 16, 2008.

* cited by examiner

*Primary Examiner* — Chirag Shah
*Assistant Examiner* — Amar Persaud
(74) *Attorney, Agent, or Firm* — O'Keefe, Egan, Peterman & Enders, LLP

(57) ABSTRACT

Methods and systems are disclosed for providing confirmed delivery of Ethernet packets. The type/length (T/L) field of the standard Ethernet protocol packet is used to provide sequence numbers for guaranteed delivery of Ethernet packets. Sequence numbers are assigned at a transmitting device and read by a receiving device to confirm delivery of the Ethernet packets. If a missing packet is detected by the receiving device, it requests retransmission of the missing packet. Because the T/L field has limited use in legacy Ethernet systems, this use of the T/L field for guaranteed delivery has little, if any, effect on legacy systems.

25 Claims, 5 Drawing Sheets

METHOD AND SYSTEM FOR PROVIDING CONFIRMED DELIVERY OF ETHERNET PACKETS

TECHNICAL FIELD

The disclosed embodiments relate to Ethernet communications according to standard Ethernet protocols and, more particularly, to the processing of Ethernet data packets.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A number of different communication protocols are utilized by current information handling systems. These communication protocols include, for example, InfiniBand (IB), Fibre Channel (FC), PCI (Peripheral Component Interconnect) Express (PCIe), and Ethernet/IP (Internet Protocol) protocols. Traditional implementations for these protocols have provided confirmed delivery of data. However, for the Ethernet protocol, this confirmed delivery has been attempted at a relatively high communication layer thereby causing inefficiencies in utilizing the Ethernet protocol if confirmed delivery is desired or required.

FIG. 1 (prior art) is a block diagram for a layered comparison 100 for the OSI (Open Systems Interconnect) layer model applied to the IF, FC, PCIe, and Ethernet/IP protocols. A check mark identifies the layer responsible for guaranteed or confirmed packet delivery in each protocol. As shown in FIG. 1 (prior art), the OSI layer model has seven layers. Layer 1 is the PHYSICAL layer representing bits being communicated including bit format and conversion. Layer 2 is the DATA LINK layer representing packets of bits being communicated including physical addressing. Layer 3 is the NETWORK layer representing packets being communicated including routing and addressing. Layer 4 is the TRANSPORT layer representing communication transport segments and can be used to provide reliable communications. Layers 5-7 represent data layers including a SESSION layer where connection establishment occurs, a PRESENTATION layer where data representation and encryption occurs, and a APPLICATION layer representing the user endpoint.

Each of the protocols shown in FIG. 1 (prior art) implement the OSI Layers differently. For the IB protocol, Layer 1 is a physical layer. Layer 2 is a MAC (machine address code) and encode layer. Layer 3 is a network layer. Layer 4 is an IBA (InfiniBand Architecture) operations layer. And Layers 5-7 are implemented by applications. For the FC protocol, Layers 1-4 are implemented according to FC protocols FC-0, FC-1, FC-2, FC-3 and FC-4. Layers 5-7 are implemented by applications. For the PCIe protocol, Layer 1 is implemented with PCIe LLP (Lower Layer Protocol). Layer 2 is implemented with PCIe DLLP (Data Link Layer Protocol). Layers 3-5 are implemented using the PCIe TLP (Transaction Layer Protocol). Layer 4 is also implemented using the PCIe DLLP. Layer 6 implemented as a driver model layer. And Layer 7 is implemented as a PnP (Plug and Play) model. For the Ethernet/IP protocol, Layer 1 is the physical Ethernet. Layer 2 is implemented as STP (Spanning Tree Protocol) or VLAN (virtual local area network) layers. Layer 3 is implemented using IP packets. Layer 4 is implemented with TCP/UDP (Transmission Control Protocol/User Datagram Protocol). Layer 5 is represented by sockets. Layer 6 is ASCII communications. And Layer 7 can be an application such as TELNET.

For each of these protocols, prior solutions have provided confirmed delivery at particular layers of the OSI Layer Model. These layers are identified with check marks 102, 104, 106 and 108, respectively. Ethernet is a relatively unreliable protocol that depends upon the upper protocol layers, such as the Layer 4 protocol TCP (Transmission Control Protocol) represented by check mark 102, to provide guaranteed packet delivery. Thus, Ethernet is disadvantaged when compared to PCIe and FC, both of which provide guaranteed packet delivery at Layer 2 as represented by check marks 104 and 106, respectively. IB also provides improved guaranteed delivery at a hardware-embedded Layer 3 (labeled Network) as represented by check mark 108.

This capability for lower level guaranteed delivery is important in systems where guaranteed delivery is desired without the overhead of the upper layers. One example would be a chassis-based computer system using Ethernet or IP-based communications as a central fabric interconnect to provide access to a limited number of physical hardware communications devices by a larger set of blade servers. Guaranteed packet delivery typically requires that packets be tagged with sequence numbers so that an indication of out-of-order packets and dropped packets may be provided. Current methods of confirmed Ethernet packet delivery, however, are not efficient and can interfere with legacy systems.

SUMMARY

The techniques described herein provide a method and system for providing confirmed delivery of Ethernet packets. In particular, the type/length (T/L) field of the standard Ethernet protocol packet is used to provide sequence numbers for guaranteed delivery of Ethernet packets. Because the T/L field has limited use in legacy Ethernet systems, this use of the T/L field for guaranteed delivery has little, if any, effect on legacy systems. As described below, other features and variations can be implemented, if desired, and a related method can be utilized, as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
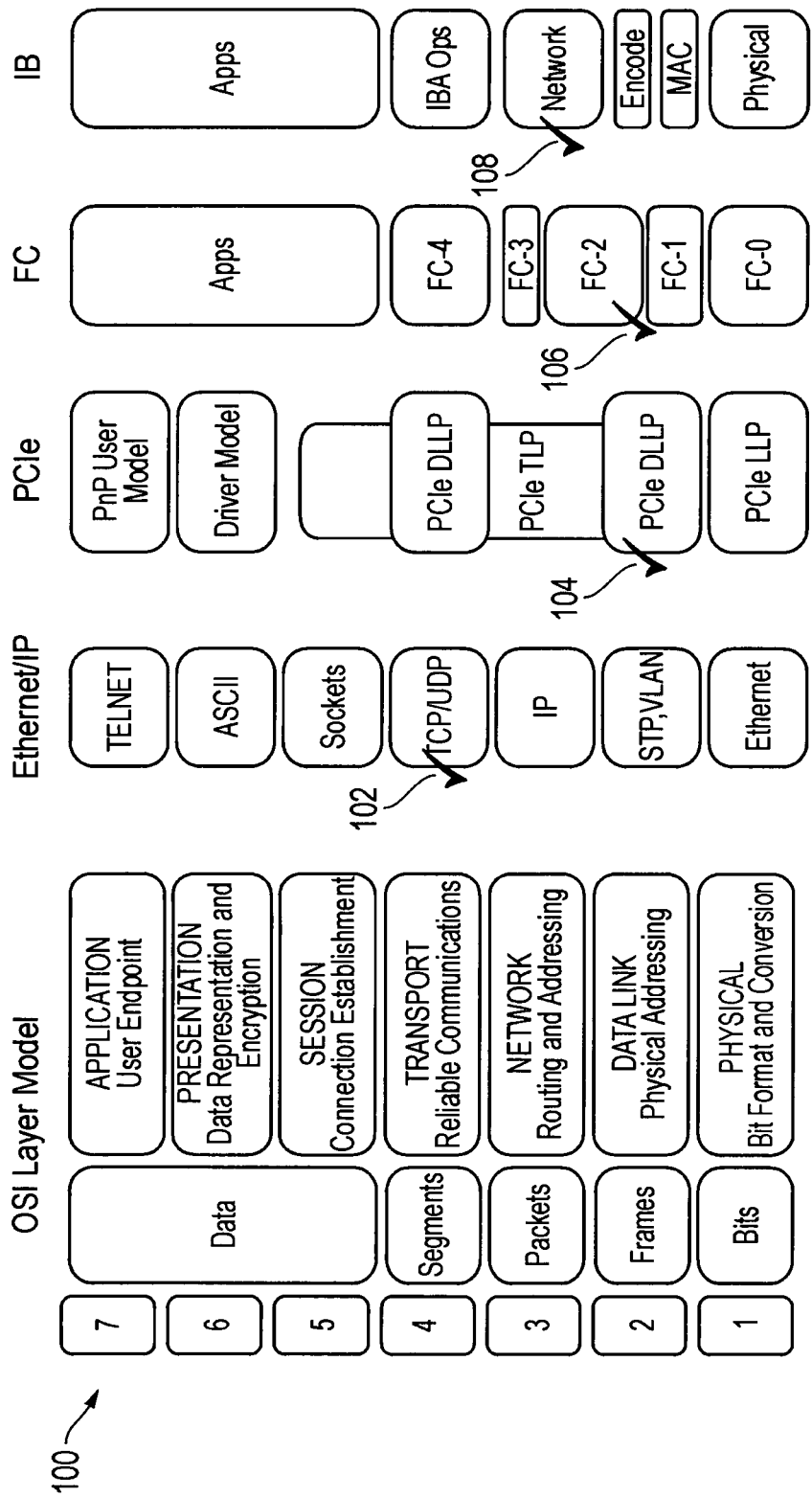
FIG. 1 (prior art) is a diagram of an OSI Layer Model and its relation to standard guaranteed delivery solutions in existing communication protocols.

Information handling systems, particularly those that communicate time sensitive information across networks, have needed the ability to provide guaranteed delivery of data and data packets. As described above with respect to FIG. 1 (prior art), many prior protocols have provided such guaranteed delivery. With respect to the Ethernet protocol, however, this guaranteed delivery has been provided at Level 4 of the OSI (Open Systems Interconnect) Model. This Level 4 solution has been an impediment to the use of the Ethernet protocol to provide guaranteed delivery. Other protocols, such as Fibre Channel (FC) and InfiniBand (IB) have provided this guaranteed delivery at Level 2 or Level 3.

With respect to the Ethernet protocol, standard fields are used to form the packets that are communicated between devices using the Ethernet protocol. For example, one standard field in the Ethernet protocol is the two-byte (i.e., 16 bits) type/length (T/L) field. This T/L field is not used to a great extent, and it has mostly historical significance as a "type" indicator. There is little efficiency gained by identification of the encapsulated protocol in the Ethernet packet at Layer 2 (which is provided a type indication in the T/L field) because deeper packet inspection is typically required in any case for standard protocol processing and steering. As such, "type" indicators are rarely used. The "type" values that are most commonly used in the T/L field are 0x0800 (DoD Internet Protocol), 0x8808 (Pause Packet), and 0x86DD (IPv6 Protocol). Most frequently and recently, a "length" value is utilized in this field instead of a "type" value. As such, type values in this field are usually ignored, and no new types have been assigned to this field in at least three years. In particular, the T/L field is a 16-bit field, represented in hex, ranging from 0x0000 thru inclusive 0xFFFF and has very few assigned values above 0x8FFF.

The techniques described herein provide a method and system for providing confirmed delivery of Ethernet packets that take advantage of this little used T/L field. In particular, as described herein, unassigned values in the T/L field of the standard Ethernet protocol packet are used to provide commands and sequence numbers for guaranteed delivery of Ethernet packets. Because the T/L field has limited use in legacy Ethernet systems, this use of the T/L field for guaranteed delivery has little, if any, effect on legacy systems. Using non-assigned values in this T/L field, therefore, makes the guaranteed delivery system described herein transparent to existing protocol header processing. As such, the guaranteed delivery system described herein is an efficient mechanism for providing sequence number support in the Ethernet packet. And this support can be additive to any protocol features already present in the end node.

As described below, sequence numbers are assigned to Ethernet packets, and the T/L is used field to hold these sequence numbers and related commands. When the receiving device reads the T/L field for each Ethernet packet from a transmitting device, the receiving device determines if a transmit command has been included and, if so, determines the sequence number for the Ethernet packet. The receiving devices also uses these sequence numbers to determine if a packet has been missed. If a packet is determined to be missing, the receiving device can issue an appropriate request to the transmitted device for retransmission of the missing packet. In this way, the systems and methods disclosed herein provide a guaranteed packet delivery mechanism at Level 2 for data communications using the Ethernet protocol. In addition, this use of the T/L field is essentially transparent to a legacy Ethernet system.

Systems and methods for using unassigned values in the T/L field of the Ethernet protocol to provide confirmed delivery of Ethernet packets are now described in more detail with respect to FIGS. 2-5.

Figure 2:
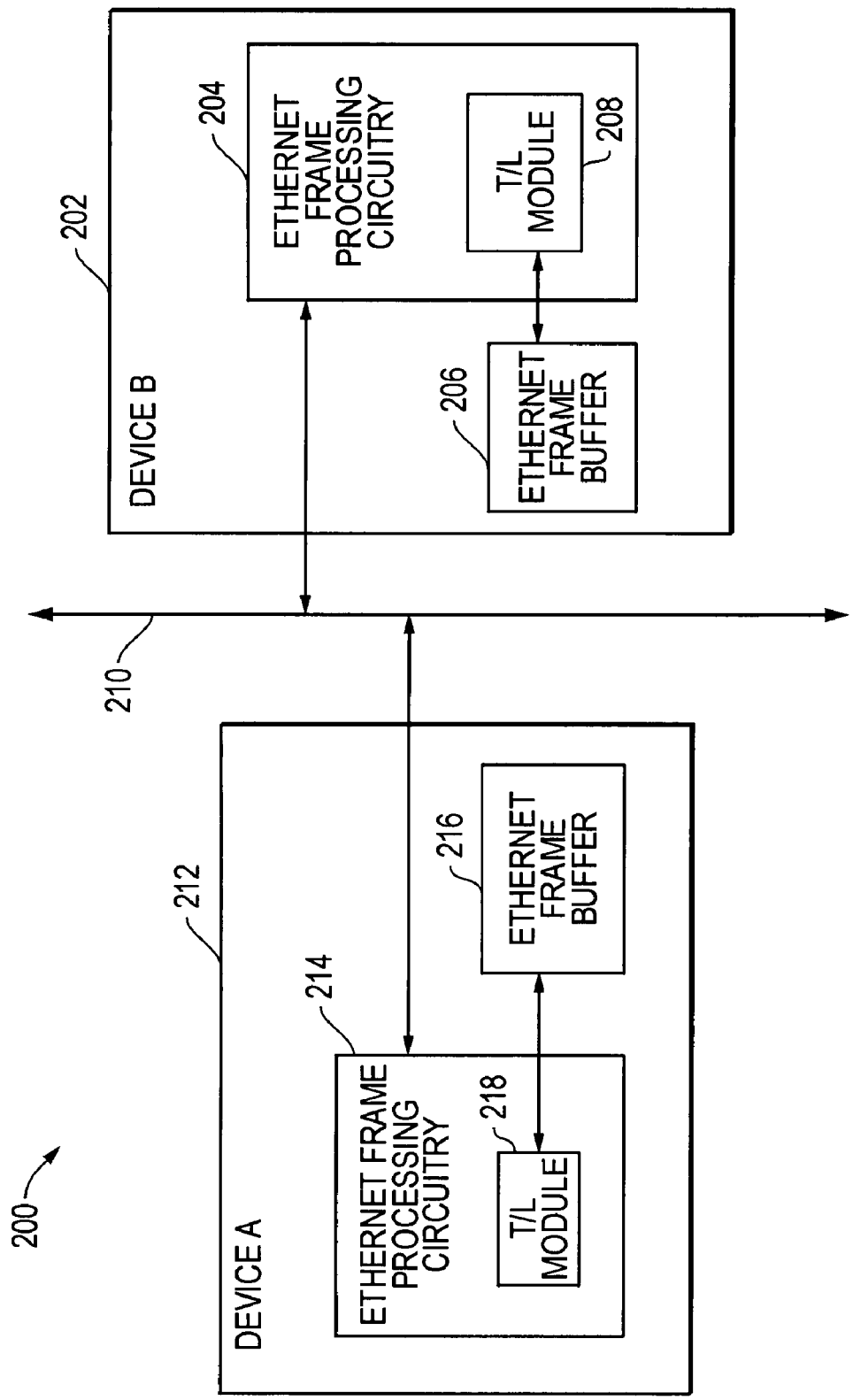
FIG. 2 is a block diagram for devices using the type/length (T/L) field for guaranteed delivery of Ethernet packets across a network.

FIG. 2 is a block diagram 200 for devices 202 and 212 using the type/length (T/L) field for guaranteed delivery of Ethernet packets across a network 210. DEVICE A 212 includes Ethernet packet processing circuitry 214, Ethernet packet buffer 216 and a T/L module 218. Similarly, DEVICE B 202 includes Ethernet packet processing circuitry 204, Ethernet packet buffer 206 and a T/L module 208. Devices 202 and 212 are configured to connect to and communicate on a network 210 using the Ethernet protocol. As shown, Ethernet packet processing circuitry 204 for DEVICE B and Ethernet packet processing circuitry 214 for DEVICE A are coupled to the network 210 to send and receive Ethernet packets.

When receiving packets, the T/L modules 208 and 218, as described herein, are configured to analyze the T/L fields of the received packets to determine packet sequence information for purposes of guaranteed delivery of Ethernet packets. The Ethernet packet buffers 206 and 216 are used to store received packets, for example, while the receiving device is determining if needed packets have been received. Missing packets are requested from the transmitting device, received and stored in the packet buffers 206 and 216. Packets can be periodically released for further processing by upper OSI layers within the devices 202 and 212 once it is determined that the proper packets have been received in a particular sequence range.

When transmitting packets, the T/L modules 208 and 218, as described herein, are configured to insert the sequence numbers and related commands into the T/L fields for the packets to be transmitted for purposes of guaranteed delivery of Ethernet packets. In addition, with respect to packets received back from the receiving device, a determination is made if a retransmit command has been received. If so, the indicated packet is retransmitted by the transmitting device to the receiving device. The Ethernet packet buffers 206 and 216 can be used to store packets being transmitted until it is determined that the receiving device did receive the packets.

It is noted that the Ethernet packet control circuitry 206 and the Ethernet packet control circuitry 216 are each configured to process Ethernet packets according to a standard Ethernet protocol. However, the addition of the T/L modules 208 and 218 within the Ethernet packet processing circuitry 204 and 214 allows unassigned values for the T/L field in the standard Ethernet packet to be used to provide sequence numbers for the guaranteed delivery of Ethernet packets. During transmit, the T/L modules 208 and 218 are configured to generate sequence numbers for a plurality of related Ethernet packets. These sequence numbers are included within the T/L field for the plurality of related Ethernet packets, along with related commands, so that delivery of Ethernet packets between devices 202 and 212 over network 210 can be guaranteed.

As described further below, a transmit command can be used to indicate a transmitted packet. This transmit command can be an unassigned value for the T/L field according to the standard Ethernet protocol. The Ethernet packets are transmitted one packet at a time from a sending or transmitting device, such as DEVICE B 202, to a receiving device, such as DEVICE A 212. The receiving device confirms receipt of the plurality of related Ethernet packets by analyzing the sequence numbers in the transmitted packets.

The receiving device can detect a missing packet sequence in a transmission sent by the transmitting device, and the receiving device can then request retransmission from the transmitting device for a packet sequence number detected as not yet received and missing. To initiate this retransmission, the receiving device can send a pause packet command to block transmission of other new packets during the packet retransmission sequence. In addition, this pause packet command can also halt the sequence ordering logic at the receiving device until the retransmitted packet is received. The pause packet command can be implemented as a standard pause packet Ethernet command (e.g., an 802.3x command). Once received and delivery is confirmed for packets in a block to be released, the received packets can be sent in an ordered sequence to an upper protocol layer for processing within the receiving device.

In a one embodiment, the transmitting of the plurality of related Ethernet packets one packet at a time includes providing an upper byte set to an unassigned value of the T/L field as a command and includes a lower byte set as an actual sequence number for the packet. Although different lengths of ordered sequences could be used, one example is to use 256 sequence numbers. For unique packet identification, therefore, 256 sequence numbers could be used and assigned in a circular fashion to transmitted packets. The Ethernet packet buffers 206 and 216 can be configured to receive and stored 256 Ethernet packets to correspond to the 256 sequence numbers. Further, the packet buffers 206 and 216 can be circular buffers where transmitted packets are stored and referenced by their sequence numbers.

By using unassigned values within the T/L field, the Layer 2 guaranteed delivery mechanism for Ethernet described herein is transparent to the normal operation of legacy Ethernet devices and LANs. And the solutions described herein provide Ethernet devices with similar low level capabilities for guaranteed delivery of data packets as those provided by Fibre Channel (FC), PCI Express (PCIe), and Infiniband (IB). Because this method provides sequence numbers for Ethernet packets using unassigned values of the type/length field, legacy protocols and equipment will ignore these unassigned type/length values.

Is noted that DEVICE A 212 and DEVICE B 202 could be any desired devices. One application, however, for these devices is where these devices are blade servers configured to communicate with each other and a blade server controller using Ethernet packets across a interconnect network 210.

Figure 3:
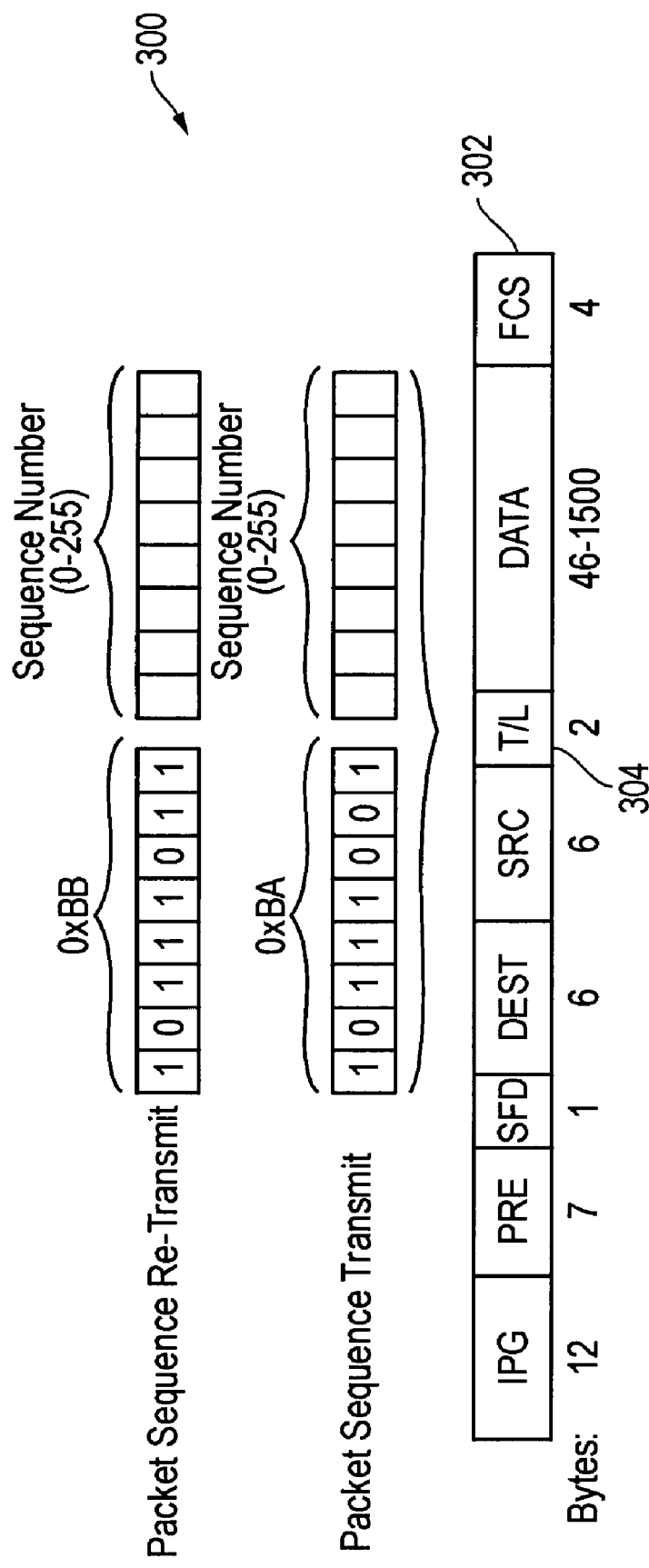
FIG. 3 is a diagram of Ethernet packet using the type/length (T/L) field for packet sequence numbering to provide guaranteed packet delivery.

FIG. 3 is a diagram 300 of an example frame for an Ethernet packet 302 using the type/length (T/L) field 304 for packet sequence numbering to provide guaranteed packet delivery. The T/L field 304 is a two-byte field in which the first byte (low byte—0) and the second byte (high byte—1) are used in the Ethernet protocol as a "type" indicator or as a "length" indicator." As indicated above, the T/L field has limited use and has many unassigned values including very few assigned values above 0x8FFF, as indicated above. As depicted in TABLE 1 below, the Ethernet packet 302 includes a number of other fields.

TABLE 1

EXAMPLE ETHERNET PACKET FIELDS

| FIELD | DESCRIPTION | BYTE LENGTH |
|---|---|---|
| IPG | Inter-Packet Gap | 12 |
| PRE | Preamble | 7 |
| SFD | Start-Packet Delimiter | 1 |
| DEST | Destination MAC Address | 6 |
| SRC | Source MAC Address | 6 |
| T/L | Type/Length Field | 2 |
| DATA | Payload | Variable from 46 to 1500 bytes |
| FCS | Packet Check Sequence | 4 |

As described herein, the T/L field in the Ethernet packet is used to provide commands and sequence numbers in order to provide guaranteed delivery of Ethernet packets. In one example, the first byte (low byte—0) is used for commands, and the second byte (high byte—1) is used for the sequence numbers. In particular, values that are unassigned in the Ethernet protocol are used herein to provide commands related to guaranteed delivery of packets. As such, these commands are transparent to and ignored by legacy Ethernet systems. The final 8-bits are then used to provide 256 sequence numbers (0-255) for the guaranteed delivery of packets. It is noted, however, that the number of bits within the T/L field used for commands and the number of bits within the T/L field used for sequence numbers could be adjusted, if desired, depending upon the operational objectives of the system.

In FIG. 3, two example commands are shown where the first byte (i.e., first 8-bits) are used as a command byte. One command is a packet sequence transmit command. This command is assigned the hex number BA, which is the binary number 10111001, and is placed in the first byte of the T/L field (i.e., 0xBA) followed by the sequence number for the packet being transmitted in the second byte of the T/L field. The other command is the packet sequence re-transmit command. This command is assigned the hex number BB, which is the binary number 10111011, and is placed in the first byte of the T/L field (i.e., 0xBB) followed by the sequence number for the packet be re-transmitted in the second byte of the T/L field. It is noted that these commands are provided as examples and other commands could be utilized as desired.

As described further below, for confirmed delivery of Ethernet packets, a plurality of related Ethernet packets are being generated by a sending device. Each packet for the Ethernet packet will include a T/L field according to the Ethernet protocol. Prior to transmitting each packet, a sequence number is generated and assigned for that packet. As such, a plurality of related Ethernet packets will have their respective sequence numbers included within the T/L field prior to being transmitted. Each transmitted packet will also have a transmit command with the T/L field to indicate that this packet is part of a sequence of transmitted packets and that a sequence number will be included in the second byte of the T/L field. As stated above, the transmit command uses a value within the T/L field that is unassigned according to the Ethernet protocol. The plurality of related Ethernet packets can then be transmitted one packet at a time from the transmitting device to the receiving device.

The plurality of related Ethernet packets are received one packet at a time by the receiving device. The T/L field for each of the received Ethernet packets is read by the receiving device to determine if a transmit command has been included, and if so, to determine the sequence number for the Ethernet packet. Receipt of the plurality of related Ethernet packets is confirmed by analyzing the sequence numbers in the packets. A buffer, such as a circular buffer, is used to store the packets so that a determination can be made of whether packets have been missed. If one is determined to have been missed, the receiving device can issue a standard PAUSE command to the transmitting device. This PAUSE command can be followed by a re-transmit command and the sequence number for the packet that was missed. It is noted that Ethernet packets are not always delivered in order, so the circular buffer is used to store the packets. The receiving device can be configured to check the buffer to see if a packet has been missed. And the buffer can be configured to store 256 packets to match the number of sequence numbers that can be designated using the 8-bit second byte of the T/L field.

As indicated above, the first byte of a T/L field can be set to an unassigned value of 0xBA (Hex) to indicate transmit, and the second byte of the T/L field can follow with a sequence number for the packet. For a re-transmit command, the first byte of the T/L field can be set to an unassigned value of 0xBB to indicate a retransmission, and the second byte of the T/L field can follow with a sequence number for the packet. This second byte provides up to 256 (i.e., 0 through 255) sequence numbers for unique packet identification assigned in a circular fashion to transmitted packets. In other words, once 255 has been assigned to a packet, the next number assigned is 0. The circular buffer can be used to store the outgoing packets, and when these packets are transmitted a sequence number will be included.

Figure 4:
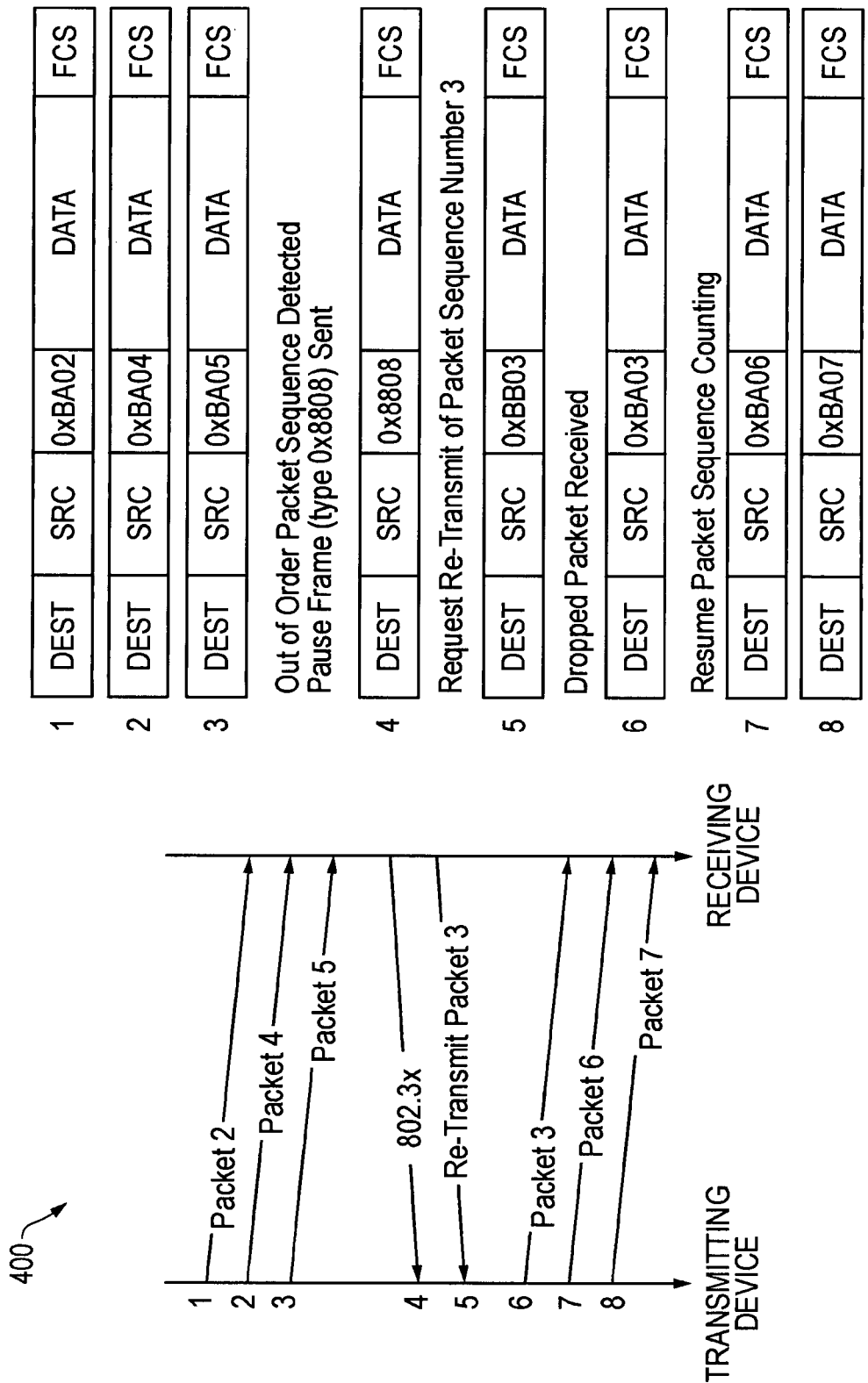
FIG. 4 is a diagram of a packet retransmission sequence utilizing the type/length (T/L) field for guaranteed delivery of Ethernets.

FIG. 4 is a diagram 400 of packet re-transmission packet sequence utilizing the T/L field for guaranteed delivery of Ethernet packets. The left portion of FIG. 4 shows the direction of the packets being transmitted in eight sequential Ethernet communication events. The rights portion of FIG. 4 shows the partial contents of the packets being transmitted. In particular, the contents of the T/L field are depicted.

In transmission Event 1, Packet 2 is transmitted from a sending device to a receiving device. The corresponding value of the T/L field for this packet is 0xBA02 (HEX). As discussed above, BA (HEX) in the first byte of the T/L field represents the transmit command, and 02 in the second byte of the T/L field represents packet sequence number 2. In transmission Event 2, Packet 4 is transmitted, and the T/L field is 0xBA04. In transmission Event 3, Packet 5 is transmitted, and the T/L field is 0xBA05. At this point, the receiving device detects a missing packet in the sequence because Packet 3 has not yet been received. It is noted that the receiving device can be configured to determine that a miss has occurred based upon X number of succeeding packets without receipt of the missing packet, where X can be a selected number greater than 1 and less than the size of the buffer. Because Ethernet packets may not always be sent sequentially through the network, it may be desirable to set this number to higher than 1, but not so high that on-time delivery to the receiving device application suffers significantly such that quality of service is significantly degraded.

After the receiving system has detected an out of sequence packet and determined that a packet has been missed, it can begin re-transmission efforts. As depicted, in transmission Event 4, the receiving device transmits a PAUSE PACKET command. This PAUSE PACKET command is according to the standard Ethernet protocol provided in 802.3x and is the type 0x8808 (HEX). Next, the receiving device sends a re-transmit packet command to the transmitting device to request a re-transmit of packet sequence number 3. As such, the T/L field is 0xBB03. As discussed above, BB (HEX) in the first byte of the T/L field represents the re-transmit command, and 03 in the second byte of the T/L field represents packet sequence number 3.

After receiving this re-transmit command, the transmitting device then re-transmits Packet 3 in transmission Event 6. In this packet, the T/L field is 0xBA03 to indicate that the payload for packet sequence number 3 is being transmitted in this Ethernet packet. The transmitting device then picks back up with its transmission of packets. As such, in transmission Event 7, Packet 6 is transmitted, and the T/L field is 0xBA06. In transmission Event 8, Packet 7 is transmitted, and the T/L field is 0xBA07. This continues until the plurality of sequenced packets have been successfully delivered to the receiving device from the transmitting device.

It is noted that when missing packet has been detected, the PAUSE PACKET command is sent by the receiving device to block transmission of other packets during the packet re-transmission sequence. The standard 802.3x pause packet command (T/L=0x8808) is sent to block transmission of other packets and to allow time for this packet retransmission sequence to occur. In addition, sequence ordering logic is halted on the receiving node until the dropped packet is received or a timeout occurs. The missing packet is then re-sent, the 802.3x pause expires, and packet sequence counting resumes with the transmission of Packet 6 and Packet 7. Once all of the packets are received by the receiving device, the sequence of packets are properly ordered and sent to the upper protocol layers for processing.

It is further noted that it is assumed that 256 buffer entries will be sufficient and that the unassigned type values of 0xBA00 through 0xBAFF and 0xBB00 through 0xBBFF can be reserved within the Ethernet protocol.

As indicated above, the number of bits used in the T/L field for the commands and the sequence numbers could be adjusted, if desired. For example, 4-bits could be dedicated to a command indication, and 12-bits (e.g., 4096 sequence numbers) could be used for the sequence numbers. In this circumstance, the circular buffers could also be expanded to hold 4096 packets. Still further, 2-bits could be used for commands, and 14-bits (e.g., 16384 sequence numbers) could be used for sequence numbers. In this further example, the commands could be B (HEX) for retransmit and C (HEX) for transmit. Alternatively, B-D (HEX) could be used for retransmit, and E-F (HEX) could be used for transmit. Still further, as long as unused values in the T/L field are being used, the T/L field can be configured as desired to hold commands and/or sequence numbers. Still further, bits within the T/L field could be used for other purposes as well. The transmit and retransmit commands are included as examples only. Other command designations could also be provided and/or the designations for the transmit and retransmit commands could be modified, as desired.

Figure 5:
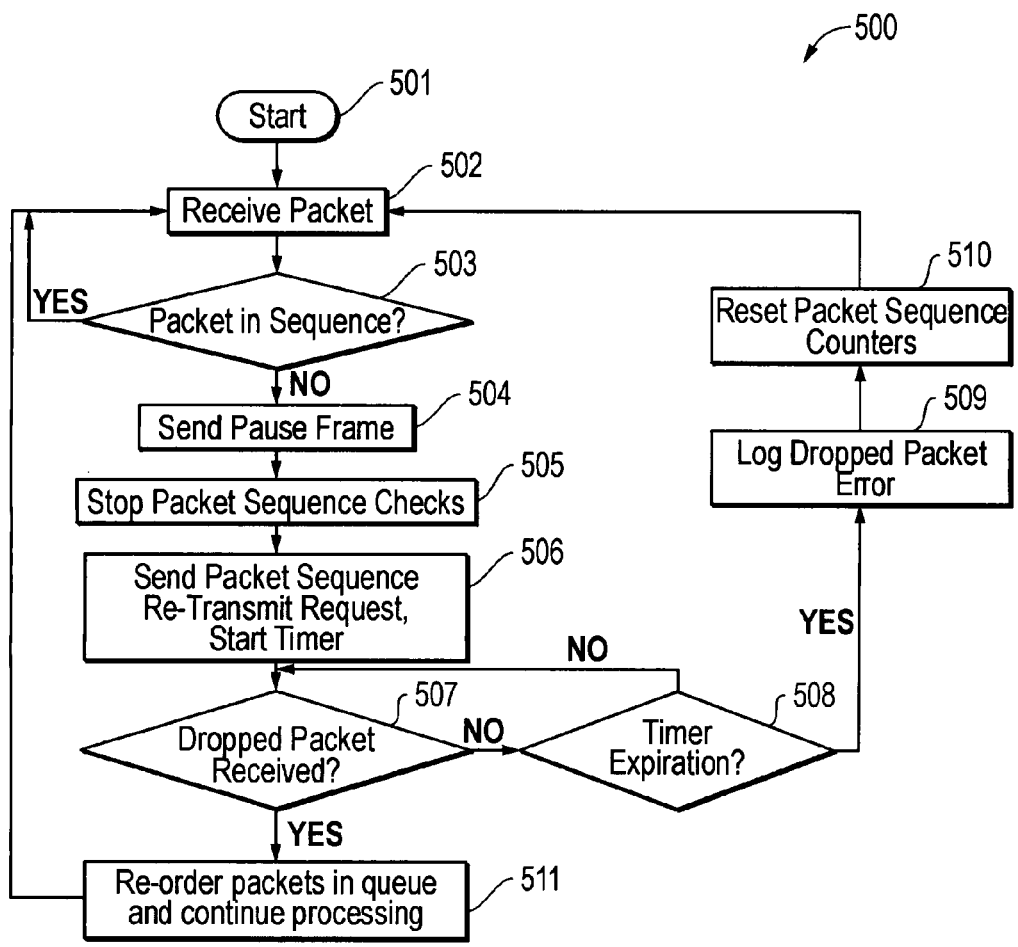
FIG. 5 is a flowchart of packet sequence retransmit processing that utilizes the type/length (T/L) field for guaranteed delivery of Ethernet packets.

FIG. 5 is a flowchart 500 of packet sequence re-transmit processing that utilizes the type/length (T/L) field for guaranteed delivery of Ethernet packets. The process begins in step 501. In step 502, a packet is received by the receiving device that has been transmitted by the transmitting device. In decision block 503, a determination is made regarding whether the packet is in sequence. If "YES," the process continues back to step 502 where other packets are sent by the transmitting device and received by the receiving device. If "NO," a pause packet command is sent in step 504 by the receiving device. As indicated above, this pause packet command is used to block transmission of other packets by the transmitting device during the packet retransmission sequence. In one embodiment, the pause packet command is an 802.3x pause packet command (i.e., 0x8808). After the pause packet is sent, packet sequence checks are stopped in step 505. In other words, sequence ordering logic is halted at the receiving device until the retransmitted packet is received from the sending device. In step 506, the receiving device sends a packet sequence retransmit request. In addition, the receiving devices starts a timer that is used to determine if the re-transmission process times out.

In decision block 507, a determination is made regarding whether the dropped packet has been received by the receiving device. If "YES," the dropped packet is received by the receiving device. In addition, the receiving device re-orders the packets in the packet queue saved in the packet buffer. The ordering logic is then continued and process flow is passed back to step 502. If "NO," the dropped packet has not yet been received. Flow passes to decision block 508 where a determination is made regarding whether the timer expired. If "NO," then the timer has not expired, and the process loops back to step 507. If "YES," the timer has expired, and flow passes to step 509 where a dropped packet error is logged. Next, in step 510, the packet sequence counters are reset, and the process flows back to the initial step 502 where the receiving device waits to receive a new packet sequence.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method of providing confirmed delivery of Ethernet packets, comprising:
    generating a plurality of related Ethernet packets, each Ethernet packet including a type/length field according to an Ethernet protocol, the type/length field being two adjacent bytes within the Ethernet packet; and
    utilizing unassigned values in the type/length field to provide confirmed delivery of Ethernet packets, the unassigned values being unassigned with respect to the Ethernet protocol.

2. The method of claim 1, wherein the utilizing step comprises utilizing a plurality of bits within the type/length field as a command field and utilizing a plurality of bits within the type/length field as a sequence number field.

3. The method of claim 2, further comprising utilizing one byte of the type/length field as the command field and a second byte of the type/length field as the sequence number field.

4. The method of claim 3, further comprising utilizing a transmit command to indicate a transmitted packet and the sequence number field to indicate a sequence number for the transmitted packet.

5. The method of claim 4, further comprising using a hex number BA as the transmit command.

6. The method of claim 2, further comprising utilizing a retransmit command to indicate a missed packet and the sequence number field to indicate a sequence number for the missed packet.

7. The method of claim 6, further comprising using a hex number BA as the retransmit command.

8. The method of claim 1, wherein the utilizing step comprises:
    assigning sequence numbers for the plurality of related Ethernet packets;
    including the sequence numbers within the type/length fields for the plurality of related Ethernet packets;
    including a transmit command within the type/length field for the plurality of related Ethernet packets, the transmit command being an unassigned value for the type/length field according to the Ethernet protocol; and
    transmitting the plurality of related Ethernet packets one packet at a time to a receiving device.

9. The method of claim 8, wherein transmitting the plurality of related Ethernet packets one packet at a time comprises providing an upper byte set to an unassigned value and a lower byte set as an actual sequence number within the Ethernet type/length field.

10. The method of claim 1, wherein the utilizing step comprises:
    receiving a plurality of related Ethernet packets from a transmitting device, each packet including a sequence number and a transmit command within the type/length field, the transmit command being an unassigned value for the type/length field according to the Ethernet protocol;
    reading the type/length field for each of the related Ethernet packets to determine if a transmit command has been included and, if so, to determine the sequence number for the Ethernet packet; and
    confirming receipt of the plurality of related Ethernet packets by analyzing the sequence numbers.

11. The method of claim 10, wherein the confirming step comprises:
    detecting if a packet sequence number is missing from the plurality of related Ethernet packets to confirm receipt of the plurality of related Ethernet packets.

12. The method of claim 11, further comprising obtaining a retransmitted packet if a packet sequence number is detected as missing, the obtaining step comprising:
  sending to the transmitting device a pause packet command to block transmission of other packets during a packet retransmission sequence;
  sending to the transmitting device a retransmit command within the type/length field of an Ethernet packet;
  halting sequence ordering logic until a retransmitted packet is received;
  receiving the retransmitted packet; and
  restarting sequence ordering logic.

13. The method of claim 10, further comprising storing sequence numbers for the plurality of related Ethernet packets in a circular buffer.

14. The method of claim 10, further comprising sending received packets in an ordered sequence to an upper protocol layer for processing.

15. The device of claim 10, wherein the packet control circuitry is further configured to receive an Ethernet packet from the receiving device and to retransmit an Ethernet packet to the receiving device if the Ethernet packet from the receiving device includes a retransmit command within the type/length field to indicate a missed packet.

16. The device of claim 15, wherein the packet control circuitry is further configured to transmit a return Ethernet packet to the transmitting device when a packet is missed, the return Ethernet packet including a retransmit command within the type/length field to indicate a missed packet and including a sequence number within the type/length field to indicate a sequence number for the missed packet.

17. A system for providing confirmed delivery of Ethernet packets, comprising:
  a transmitting device including Ethernet packet control circuitry configured to process Ethernet packets according to an Ethernet protocol, and including type/length field control circuitry configured to generate sequence numbers for a plurality of related Ethernet packets, to include the sequence numbers within a type/length field for the plurality of related Ethernet packets, and to include a transmit command within the type/length field for the plurality of related Ethernet packets, the type/length field being two adjacent bytes within the Ethernet packet; and
  a receiving device including Ethernet packet control circuitry configured to process Ethernet packets according to the Ethernet protocol, and including type/length field control circuitry configured to read the type/length field to determine if a transmit command has been included and, if so, to determine the sequence number for the Ethernet packet;
  wherein the transmit command and sequence numbers represent unassigned type values for the type/length field according to the Ethernet protocol.

18. The system of claim 17, wherein a plurality of bits within the type/length field are used as a command field and utilizing a plurality of bits within the type/length field are used as a sequence number field.

19. The system of claim 18, wherein one byte of the type/length field is used as the command field and a second byte of the type/length field is used as the sequence number field.

20. The system of claim 17, wherein the receiving device is further configured to transmit a return Ethernet packet to the transmitting device when a packet is missed, the return Ethernet packet including a retransmit command within the type/length field to indicate a missed packet and to include a sequence number within the type/length field to indicate a sequence number for the missed packet.

21. The system of claim 17, wherein the receiving device further comprises a circular buffer configured to store the transmitted Ethernet packets.

22. The system of claim 21, wherein the receiving device is configured to store the Ethernet packets in order based upon their sequence numbers.

23. The system of claim 17, wherein the transmitting device further comprises a circular buffer configured to store the Ethernet packets being transmitted.

24. A device transmitting Ethernet packets, comprising:
  packet control circuitry operating to transmit a plurality of Ethernet packets according to an Ethernet protocol to a receiving device, each Ethernet packet including a type/length field, the type/length field being two adjacent bytes within the Ethernet packet;
  type/length field control circuitry configured to generate sequence numbers for the plurality of related Ethernet packets, to include the sequence numbers within the type/length field for the plurality of related Ethernet packets, and to include a transmit command within the type/length field for the plurality of related Ethernet packets; and
  a frame buffer configured to store the Ethernet packets being transmitted;
  wherein the transmit command and sequence numbers represent unassigned type values for the type/length field according to the Ethernet protocol.

25. A device receiving Ethernet packets, comprising:
  packet control circuitry operating to receive a plurality of Ethernet packets according to an Ethernet protocol from a transmitting device, each Ethernet packet including a type/length field, the type/length field being two adjacent bytes within the Ethernet packet;
  type/length field control circuitry configured to read the type/length field to determine if a transmit command has been included and, if so, to determine the sequence number for the Ethernet packet; and
  a frame buffer configured to store the Ethernet packets being received;
  wherein the retransmit command represents an unassigned type value for the type/length field according to the Ethernet protocol.

* * * * *